United States Patent
Wong et al.

Patent Number: 5,164,217
Date of Patent: Nov. 17, 1992

[54] PROCESS OF MAKING LOW FAT NUTS

[75] Inventors: Vincent Y. Wong, West Chester; Richard J. Sackenheim, Hamilton, both of Ohio

[73] Assignee: The Procter & Gamble Company, Cincinnati, Ohio

[21] Appl. No.: 733,508

[22] Filed: Jul. 22, 1991

[51] Int. Cl.⁵ .............................. A23L 1/36
[52] U.S. Cl. .................. 426/632; 426/417; 426/466; 426/523
[58] Field of Search ............ 426/632, 417, 523, 466

[56] References Cited

U.S. PATENT DOCUMENTS

| | | | |
|---|---|---|---|
| 1,850,971 | 3/1932 | Rosenfield | 426/632 |
| 3,294,549 | 12/1966 | Vix et al. | 99/126 |
| 3,645,752 | 2/1972 | Baxley et al. | 99/126 |
| 3,740,236 | 6/1973 | Baxley et al. | 99/126 |
| 4,049,833 | 9/1977 | Gannis et al. | 426/93 |
| 4,329,375 | 5/1982 | Holloway, Jr. et al. | 426/417 |
| 4,466,987 | 8/1984 | Wilkins et al. | 426/417 |
| 4,938,987 | 7/1990 | Gannis et al. | 426/632 |
| 5,002,802 | 3/1991 | Gannis et al. | 426/632 |

*Primary Examiner*—Jeanette Hunter
*Assistant Examiner*—Helen Pratt
*Attorney, Agent, or Firm*—Rose Ann Dabek; Jerry J. Yetter

[57] ABSTRACT

Raw or roasted nuts can be pressed at pressure of 1500 to 7500 psig to remove up to 80% of the oil by mixing them with a food compatible particulate material in the press. The particulate has a particle size of less than 100 microns and is food compatible. In a preferred process, peanuts are mixed with a peanut oil slurry of salt with a particle size of less than 40 microns in a hydraulic press and pressd at 5200 psig for 10 minutes. The pressed nuts are hydrated and then roasted.

25 Claims, 4 Drawing Sheets

PROCESS OF MAKING LOW FAT NUTS

FIELD OF THE INVENTION

This invention relates to a method for removing from 25% to 80% of the fat or oil from whole nuts. The reduced fat nuts have substantially the same appearance as the native nut.

BACKGROUND OF THE INVENTION

Nuts are very good sources of protein and fat. They contain in the range of 35% to 50% fat. In addition, nuts are often roasted in oil, which increases the fat content of roasted nuts by 1 to 2%. In light of the dietary concerns of ingesting too much fat or oil, many processes for lowering the fat content of nuts have been developed. These processes include not only roasting the nuts without oil, but also pressing the nuts before roasting to remove some of the oil. Pressing removes 25% to 80% of the fat, but it results in fractured nuts, cell distortion within the nut and flattening of the nuts. Pressing after roasting causes the nuts to fracture or break even more. Broken and deformed or misshaped nuts are not appealing to the consumer.

BACKGROUND ART

U.S. Pat. No. 3,294,549 issued to Vix et al. (U.S. Department of Agriculture, 1966) describes a process for partially defatting nut meats. The nuts are pressed in a hydraulic press. The nuts can be processed cold or heated first with steam. After pressing the nuts are returned to their original shape by soaking in an aqueous solution. They are then dried to 3-8% moisture and then roasted. Either blanched or unblanched nuts can be used.

U.S. Pat. No. 4,049,833 issued to Gannis et al. (Standard Brands, 1977) discloses a process wherein partially defatted nuts are contacted with a glycerol-containing solution to reconstitute the nuts to their original size and shape. Raw nuts are partially defatted using a hydraulic press, and when sleeped in an aqueous solution containing glycerol. Following this reconstitution, the nuts are roasted.

U.S. Pat. No. 4,938,987 issued to Gannis et al. (Nabisco Brands, 1990) discloses a process for preparing low-fat roasted nuts. The nuts are pressed to remove 40-52% of their oil and then roasted by contacting the nuts with a finely divided heat transfer vehicle, for example, salt, sand, ceramic beads or metal balls.

U.S. Pat. No. 1,850,971 issued to Rosenfield (unassigned, 1932) discloses the use of a heat transfer vehicle in roasting. This includes sand and salt.

U.S. Pat. No. 3,645,752 issued to Baxley (Peanut Research & Testing Laboratories, 1972) discloses a process for making flavor impregnated peanuts by pressing oil from nuts, roasting the nuts in an oil bath to return them to their original size and shape and then, treating them in a second oil bath containing flavored oils.

U.S. Pat. No. 4,329,375 issued to Holloway et al. (Nabisco Brands, 1982) discloses a process for preparing low-fat nuts wherein the nuts are partially roasted, hydrated and equilibrated to obtain a uniform moisture content of 4-8%, and then pressed to remove the oil. The defatted nuts are then rehydrated to regain their normal shape and finally roasted to develop flavor and color. The advantage of this process is that the original size and shapes of the nuts is more closely achieved. The nuts are also said to have more natural peanut flavor.

One of the disadvantages of pressing nuts in a hydraulic cage press is that the nut's shape is distorted and, the nuts are often crushed. Peanuts are split in half or broken into pieces and deformed or flattened. Cracks form in peanut halves. Pressing also ruptures the cells of the nuts releasing oil and flavor precursors. The pressed nuts are rehydrated to recover their original shape and size before roasting. Accordingly, a process for removing 35% to 80% of the oil from a nut without distorting its shape, rupturing the internal cells, and retaining the nuts as "whole" nuts is highly desirable.

It is an object of this invention to produce a low fat nut product which has 25% or more fat removed, wherein the nuts have twice the level of whole nuts as conventional defatting processes and are less cracked and distorted than prior conventionally processed nuts.

It is a further object of this invention to produce a nut having 35% to 80% less fat than the native nut which when roasted, has a good nut flavor and texture.

A third object of this invention is to provide a process which can be used to defat roasted or unroasted nuts and which can be used on all types of nuts, and in particular, fragile and irregularly shaped nuts like walnuts and pecans.

These and other objects will become apparent from the description herein.

All percentages are by weight unless otherwise indicated.

DETAILED DESCRIPTION OF THE FIGURES

FIG. 1 are whole raw peanuts. 1A are full fat nuts, 1B are raw nuts conventionally defatted and 1C are raw nuts defatted by the process herein.

FIG. 2 are split peanuts. 2A are full fat raw peanuts; 2B are conventionally defatted peanuts and 2C are defatted by the process herein.

FIG. 3 depicts roasted whole nuts. 3A are full fat nuts, 3B are conventionally pressed nuts and 3C are the nuts pressed according to this invention.

FIG. 4 depicts roasted split nuts. 4A are full fat nuts, 4B are conventionally pressed nuts and 4C are the nuts of this invention.

The conventionally processed peanuts are prepared by a process similar to that described in Vix, U.S. Pat. No. 3,294,549. The peanuts were oil roasted. The defatted nuts were hydrated before oil roasting.

SUMMARY OF THE INVENTION

A whole or halved nut having at least 25% less fat than the native nut and a lower packed density than nuts defatted by other processing techniques is disclosed. The nuts have a higher percentage of whole nuts which are not cracked, split or otherwise damaged than those made by conventional processing.

These nuts are prepared by pressing the fat or oil from a nut by mixing nuts with a particulate material, for example, salt, sand, ceramic, sugar, starch and peanut solids; pressing the nut/particulate mixture at between about 1500 and 7500 psig (102 to 510 atm); separating the nuts from the particulate; and optionally, washing the mixture with water at a temperature of from 40° F. (4° C.) to 12° F. (100° C.) for about 0.25 to 2 minutes to remove the oil and particulates from the nuts. The nuts can be roasted immediately, or preferably, hydrated with water at a temperature of 150° F.

(65° C.) to 212° F. (100° C.) for 1 to about 20 minutes, and then roasted. Roasted nuts can also be used in the process herein. Roasting can be either dry roasting or oil roasting.

DETAILED DESCRIPTION OF THE INVENTION

As used herein the term "nut" includes oil seeds, tree nuts or legumes which are edible.

As used herein the term "particulate" includes inert solids which are food compatible and which have a particle size in the range of 10 microns to 1000 microns. Generally crystalline or non-deformable solid materials are used. The particulates should be substantially oil-insoluble. Non-deformable means it has limited ability to distort or compress under the pressure exerted in the pressing step, so that it does not lose its ability to support the nuts. In addition it must not release materials which would adversely affect the flavor of the nuts when it is compressed.

By "salt" is meant a crystalline inorganic salt, as an alkali and alkaline earth metal cation and an anion selected from the group of halides, carbonates, sulfates and phosphates. Preferred salts are sodium chloride, potassium chloride, sodium carbonate and calcium phosphate. Most preferred is sodium chloride.

By "oil" herein is meant a natural or synthetic triglyceride which is liquid at room or elevated temperature (15° C. to 55° C.). Preferably the oil is pumpable at room temperature. Oils include peanut oil and other nut oils as well as vegetable oils and non-digestible oils.

Nuts include any of the edible tree nuts or legumes, or other oil seeds which are edible when roasted. The nuts used in this process include peanuts, walnuts, pecans, almonds, filberts, Brazil nuts, soybeans, cocoa beans, and the like.

The nuts are separated from any shells, twigs, or other debris using conventional techniques. Peanuts and other nuts are sometimes blanched before roasting or after the oil is removed in the pressing step. Blanching is a process for removing the skins from the nut. Peanuts are blanched by a spin blanching process or buff blanching process. Both can be used herein. While the nuts may be roasted before removal of the oil, it is preferred that the nuts be raw when pressed.

The moisture of the nuts is not as important a factor in the process of this invention as it is in other pressing processes. Usually the drier the nut, the more brittle it becomes. Most nuts have an initial moisture of about 10%. Blanched peanuts have a moisture content of 5% to 7%. Both types of nuts work well herein. When the particulate is water soluble, higher moisture nuts can cause caking of the particulate. Separation of the defatted nuts from the particulate, especially salt, is facilitated when the nuts are dried to a moisture content of less than 6% moisture, preferably to 3 to 5% moisture.

The drying conditions affects the brittleness of the dried nut to some extent. Drying under mild conditions (100° F. (38° C.) or less) produces less brittle or more resilient nuts than those dried at 200° F. (93° C.).

The nuts are mixed with the particulate material and added to a conventional press for removing oil. The particulate and nuts can be mixed together, added to the press as layers, or otherwise combined. The key is to have the particulate fill the voids between the nuts. Therefore, shaking or agitating the mixture of particulate and nuts is helpful.

As the oil is released, it mixes with the particulates and nuts during the pressing operation. In an alternative procedure, a slurry of particulate and oil can be made initially. The nuts are placed in the cage press and the particulate/oil slurry pumped through the bed of nuts. Preferably the slurry is pumped from the bottom of the bed. The oil/salt slurry can be made with natural or a synthetic oil. Natural oils include vegetable oils and peanut oil. Preferred oils used herein include hydrogenated and unhydrogenated soybean oil, sunflower seed oil, peanut oil, corn oil, canola oil, olive oil and rapeseed oil. Low calorie or zero calorie oils can also be used. Preferably the oil used in the slurry is the same as the oil released from the nuts. For example, peanut oil is used for peanuts. This allows the particulates and oil to be recycled.

The nuts filter the particulates forming a substantially uniform bed. As a result, voids between the nuts are filled with particulate. This provides for more uniform pressure on the nut when it is compressed in the defatting operation. This support given during the pressing allows the nuts to be flattened with a minimal amount of damage. Visually, most of the nuts remained whole with no indentation or cracks as in prior art processed nuts. Damage to the cells is also less than in conventionally pressed nuts.

The particulate material includes any food compatible crystalline or non-deformable material of a particle size of up to 1000μ. Preferably the major portion of the particulates fall within the size range of 10 to 500μ. Generally the particulate material should be less than about 1/10 size of the nut to keep it from shifting or moving during the pressing. Particulates includes sand, silica gel, hydrophobic silicas, precipitated silicas, salt, spent coffee grounds, peanut particles, ground nut shells, maltodextrin, starch, sugars, fibers, cellulose, polydextrose and the like. Plastic beads made of polyethylene, polypropylene, polyesters and polyacrylates can also be used. The most preferred particulates are salt, sucrose and silica. The criteria are that it must be food compatible, i.e. be capable of contacting an edible product without contamination, and it must not release such a contaminant under the pressures used in the press.

Finely ground flavor salts (sodium chloride) are preferred for use herein. A finely ground flavor salt with an average particle size of 400 microns works well. These are commercially available. Cargill supplies a Premier fine flake salt (sodium chloride) which has an average particle size of 400 microns.

The weight ratio of particulate to nuts is in the range of 1:1 to 3:1. The exact ratio depends on the configuration of the press and the relationship of the nut size to particulate size. The oil to particulate ratio is usually from 1:1 to 3:1. The exact proportions depend on the viscosity of the oil and the particulate size.

The maintenance of the nut as a whole product, and, the prevention of the deformation of the nut during pressing enables more cells to remain intact. This provides a better roasted flavor in the final product since the flavor precursors remain in their native state. It also allows the nuts to be seasoned or flavored without too much additional breaking of the final product. Nuts are usually tumbled with the seasoning which causes breakage of the more brittle defatted, roasted nuts.

The nuts are pressed at a pressure of 1500 to 7500 psig (pounds per square inch gauge) or 102 to 510 atmospheres (atm) in a conventional hydraulic press or a cage press. The pressure is applied incrementally as in conventional pressing. Typically the maximum pressure is reached in the first few minutes of the pressing operation. The important thing is not to instantaneously apply the maximum pressure, i.e. to go from 0 to 5000 psig in one step. The nuts are pressed for from about 5 minutes to 30 minutes. The higher the pressure, the shorter the press time. A total of 10 minutes at 5100 psig (346.8 atm) is usually sufficient to lower the fat content by about 80%.

The nuts/oil/particulate mixture is removed from the cage and the resultant cake is broken and screened to separate the particulate from the nuts. This can be done using conventional screening methods, for example, vibratory screens, sieving, tumbling in a drum, or other type of conventional delumping or screening equipment. Mechanical separation of salt or sugar (when it is the particulate) is facilitated if the nuts are initially dried to less than 4% moisture. Impacting the nut particulate/oil mixture with air pressure or a water wash can also be used to separate particulates from the nuts. Usually rinsing with ambient water up to 100° F. (38° C.) for a short time (about 15 seconds to 2 minutes) is sufficient.

Figure 1A:
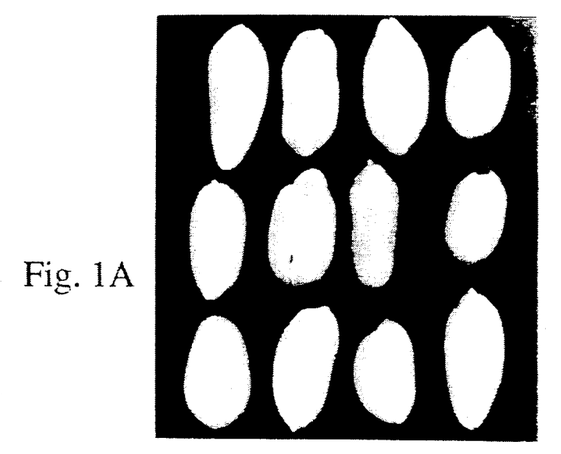
Figure 1B:
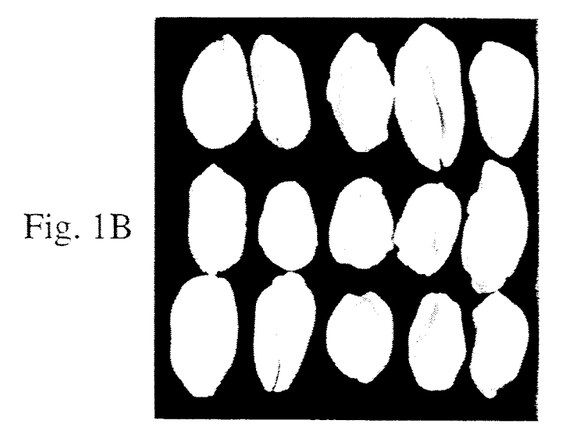
Figure 1C:
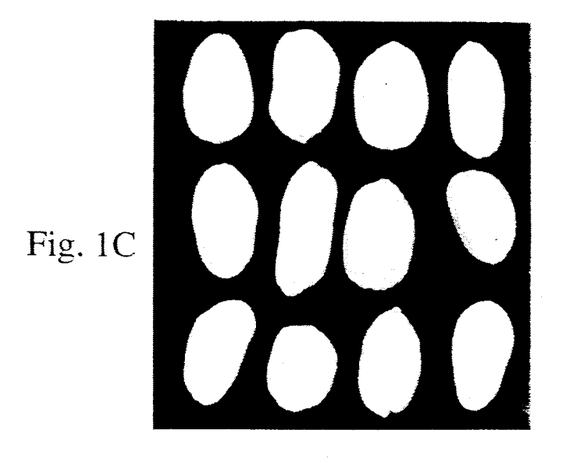
Figure 2A:
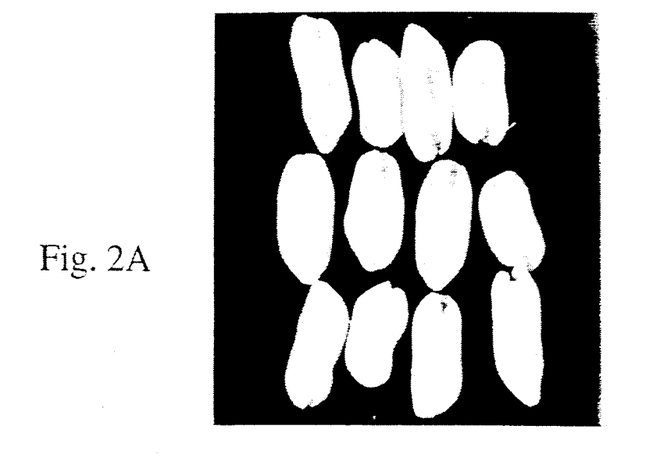
Figure 2B:
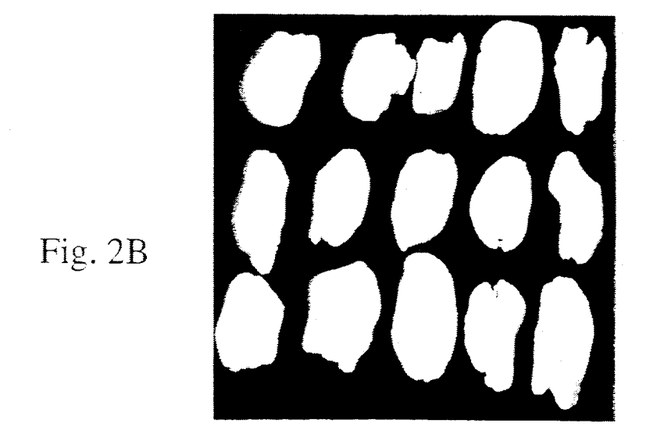
Figure 2C:
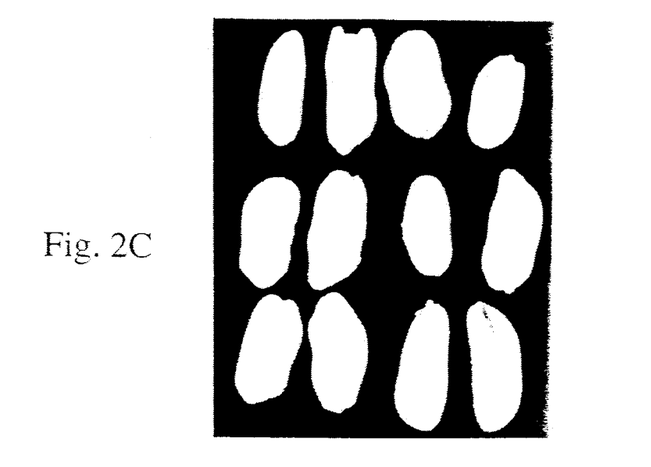

The nuts will be slightly flattened due to the pressure exerted on them (see FIGS. 1 and 2). The flattened nuts are reconstituted or returned to their approximate original size by hydrating them in an aqueous solution at a temperature of from about 150° F. (65° C.) to about 212° F. (100° C.) for from 1 to 5 minutes. Preferably the temperature is from about 170° F. (76° C.) to 190° F. (87° C.) for 2 to 3 minutes. The hydration also serves the purpose of washing off any occluding particulate material.

Flavors can be added to the hydration water. For example, dextrose or other reducing sugars can be used to develop browned flavor and color. Other flavor additives, coloring agents, and flavor precursors can also be used. Maltodextrin can also be added during hydration. Nuts coated with maltodextrin absorb less oil when oil roasted. Spices, honey flavors, barbecue or jalepeno pepper flavors are examples of flavors that can be used in this step.

The raw nuts have a soft, moist outer structure where the nut has been hydrated. Because of the use of the particulate material to cushion the nuts in the pressing process, the center of the nut remains substantially intact. Thus, there are retained whole cells in the nut core which provide improved flavor to the roasted nuts.

It is not necessary to hydrate the nuts before oil roasting. The oil roasting process will restore the nut to essentially its original shape. They tend to taste spongy/soft in texture compared to their counterparts that were hydrated.

The defatted nuts are treated as whole fat (native) nuts for conventional roasting or blanching and roasting. It is important that the hydrated nuts be roasted or in the alternative, dried to a low moisture content (3% or less) within 20 minutes of separation from the water. Hydration increases the moisture content to a level where spoilage could occur if the nuts are held too long.

Due to the amount of oil removed during the pressing operation, the nuts can be roasted in oil without increasing the oil content to unacceptably high levels. Flavored oils, polyunsaturated oils or low calorie or zero calorie oils can be used for oil roasting. The nuts can also be dry roasted. Dry roasting can be used to lower the fat content of the nuts to 20% or less.

Nondigestible fats can be used alone or with other natural or synthetic triglycerides for roasting the defatted nuts. These nondigestible fats component comprises from about 10 to 100% of the oil roasting composition. Preferably, this nondigestible fat component comprises from about 35 to 100%, more preferably from about 50 to 100% of the composition. Inclusion of higher levels of this nondigestible fat component is particularly desirable in terms of reducing the caloric value and total saturated fat levels of the nuts.

Usually, this nondigestible fat component comprises at least about 85% liquid nondigestible oil, having a complete melting point below about 37° C. Preferably, this nondigestible fat component comprises from about 85 to about 99%, most preferably from about 90 to about 99% liquid nondigestible oil.

Suitable liquid nondigestible edible oils for use herein include liquid polyol fatty acid polyesters (see U.S. Pat. No. 4,005,195 to Jandacek, issued Jan. 25, 1977); liquid esters of tricarballylic acids (see U.S. Pat. No. 4,508,746 to Hamm, issued Apr. 2, 1985); liquid diesters of dicarboxylic acids such as derivatives of T 15 malonic and succinic acid (see U.S. Pat. No. 4,582,927 to Fulcher, issued Apr. 15, 1986); liquid triglycerides of alpha-branched chain carboxylic acids (see U.S. Pat. No. 3,579,548 to Whyte, issued May 18, 1971); liquid ethers and ether esters containing the neopentyl moiety (see U.S. Pat. No. 2,962,419 to Minich, issued Nov. 29, 1960); liquid fatty polyethers of polyglycerol (See U.S. Pat. No. 3,932,532 to Hunter et al, issued Jan. 13, 1976); liquid alkyl glycoside fatty acid polyesters (see U.S. Pat. No. 4,840,815 to Meyer et al, issued June 20, 1989); liquid polyesters of two ether linked hydroxypolycarboxylic acids (e.g., citric or isocitric acid) (see U.S. Pat. No. 4,888,195 to Huhn et al, issued Dec. 19, 1988); liquid esters of epoxide-extended polyols (see U.S. Pat. No. 4,861,613 to White et al, issued Aug. 29, 1989); all of which are incorporated herein by reference.

Preferred liquid nondigestible oils are the liquid polyol fatty acid polyesters that comprise liquid sugar fatty acid polyesters, liquid sugar alcohol fatty acid polyesters, and mixtures thereof. The sugars and sugar alcohols used should have 4 to 11 hydroxyl groups (preferably from 4 to 8 hydroxyl groups) prior to esterification. With regard to the liquid polyol polyesters, the term "sugar" includes monosaccharides, disaccharides and trisaccharides. The term "sugar alcohol" refers to the reduction product of sugars wherein the aldehyde or ketone group has been reduced to an alcohol.

Examples of suitable monosaccharides are xylose, arabinose, ribose, glucose, mannose, galactose and fructose. Sugar alcohols include xylitol, erythritol, and sorbitol. Examples of suitable disaccharides are maltose, lactose, and sucrose. Examples of suitable trisaccharides include raffinose and maltotriose. Preferred polyols for preparing the liquid polyesters are erythritol, xylitol, sorbitol, glucose and sucrose. Sucrose is especially preferred.

The liquid polyol fatty acid polyesters useful in the present invention must contain at least 4 fatty acid ester groups as these compounds are substantially nondigestible and consequently nonabsorbable by the human body. It is not necessary that all of the hydroxyl groups of the polyol be esterified with fatty acids, but it is preferable that the disaccharide polyols contain no more than 3 unesterified hydroxyl groups. Most preferably, substantially all of the hydroxyl groups of the disaccharide polyol are esterified with fatty acids, e.g., the liquid sucrose polyesters have from about 7 to 8 hydroxyl groups esterified.

The sugar or sugar alcohol starting materials of these liquid polyol polyesters are esterified with fatty acids containing from 2 to 24 carbon atoms, preferably from 8 to 22 carbon atoms, and most preferably from 12 to 22 carbon atoms. Examples of such fatty acids include acetic, butyric, caproic, caprylic, capric, lauric, myristic, myristoleic, palmitic, palmitoleic, stearic, oleic, elaidic, ricinoleic, linoleic, linolenic, eleostearic, arachidonic, behenic, brassidic and erucic acid. The fatty acids can be derived from naturally occurring or synthetic fatty acids. Suitable sources of naturally occurring fatty acids include corn oil, cottonseed oil, peanut oil, soybean oil, canola oil (i.e. fatty acids derived from low erucic acid rapeseed oil), sunflower seed oil, sesame seed oil, safflower oil, palm kernel oil, and coconut oil. The fatty acids can be saturated or unsaturated, including positional or geometrical isomers, e.g., cis- or trans-isomers, and can be the same for all ester groups, or, more typically, are mixtures of different fatty acids.

Suitable triglyceride oils that can be used for roasting the nuts or used in the oil/particulate slurry can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Oils predominating in glycerides of unsaturated acids may be hydrogenated to maintain flavor.

Solid or plastic fats can be derived from plants or animals or other edible synthetic fats or oils can also be used. For example, animal fats such as lard, tallow, oleo oil, oleo stock, oleo stearin and the like which are solid at room temperature can be utilized. Triglycerides in which one or more of the hydroxyls is esterified with a low molecular weight fatty acid, i.e., acetyl, propionyl, butyryl, caproyl, caprylyl, or capryl radicals are also useful. Usually the remaining hydroxyl groups (if any) are esterified with acyl radicals of saturated or unsaturated fatty acids having from 12 to 24 carbon atoms.

The process herein can be adapted to press scrap nut pieces or splits and difficult to press nuts. The particulates help cushion the nut pieces.

The defatted nuts herein have an oil content of 20% to 40%. When they are oil roasted, the fat content increases by 3% to 25% on a finished product basis, i.e. from initial fat level of 20% to 21% to 25% after roasting. Full fat nuts have a higher oil content, 40% to 60% when oil roasted. They also have a shiny surface due to the oil on the surface of the nut.

This oily appearance can be achieved on the nuts of this invention without raising the fat content above the desired level by spraying sufficient oil on the surface or soaking the nuts in an oil for sufficient time to evenly coat the surface. For example, a peanut defatted from 50% to 20% fat content can be oil roasted to produce a roasted nut having about 25% fat. This nut is then soaked in oil to make a nut which has 28% to 32% oil.

The oil used to coat the nuts can be any vegetable or oilseed oil. Preferably it will be the same as the nut used, e.g. walnut oil for walnuts, peanut oil for peanuts, etc. Flavored oils can also be used as can polyunsaturated oils which are not useful as frying oils due to their tendency to oxidize or burn. Polyunsaturated oils are considered also to be healthy oils.

The following examples illustrate the invention but are not intended to be limiting thereof.

EXAMPLE 1

Process for Making Low Fat Peanuts

A mixture comprising of 350 gms of raw buff blanched extra large Virginia peanuts pre-dried to a moisture of 3 to 4% and 960 gms of a salt/oil slurry (64% salt/36% oil) is placed in a cage press and pressed for 10 minutes at 5100 psig and ambient temperature. The salt is a finely ground sodium chloride having a particle size of less than 400 microns. The pressure is applied incrementally over the 10 minute period. The resultant peanut/salt cake is broken and screened to separate the salt from the peanuts. The salt is re-combined with some of the expressed peanut oil and re-used. The fat content of the defatted peanut is 19-20% by weight. Conventionally defatted peanuts are 28-30% fat. The pressed peanuts have a smooth outer surface with very little indentation. (See FIG. 2C.) For comparison conventionally defatted peanuts have an irregular surface that has cracks and indentations due to peanut-peanut contact in the defatting process. (See FIG. 2B). The peanuts defatted in this process also have a significantly higher number of whole peanuts than conventionally defatted peanuts. Moreover, the cotyledon halves of the whole peanuts are aligned and tightly held together so that only a small number of the whole peanuts break apart in subsequent processes. In conventionally defatted peanuts a number of the cotyledon halves of the whole peanuts are misaligned and are loosely held together only by the germ. Thus, a small number of the whole peanuts remain in the finished product.

Figure 3A:
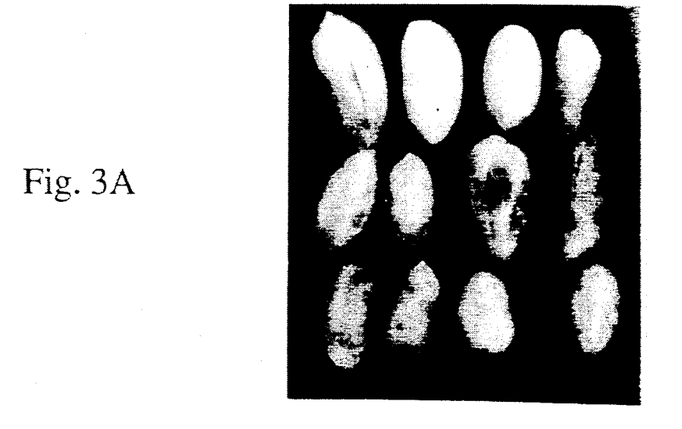
Figure 3B:
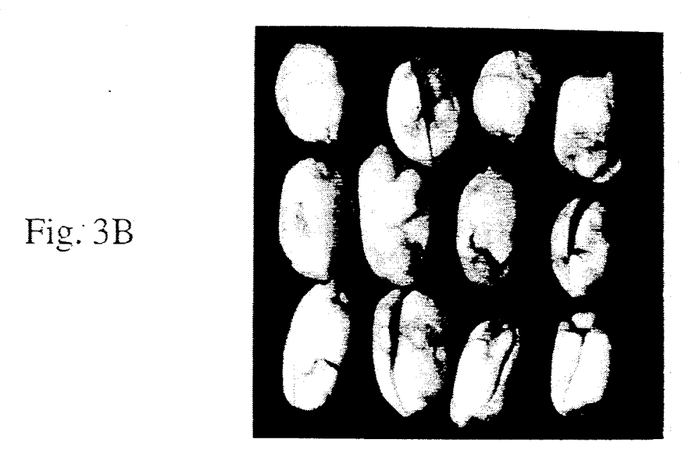
Figure 3C:
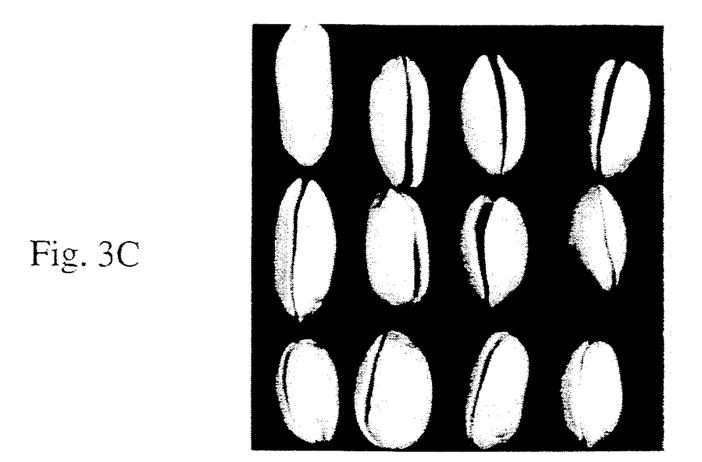
Figure 4A:
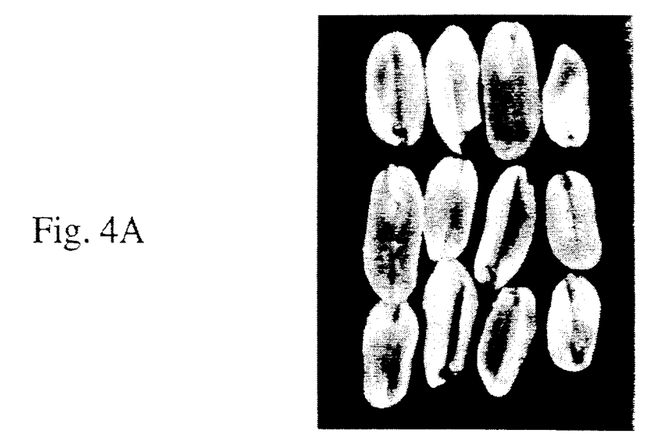
Figure 4B:
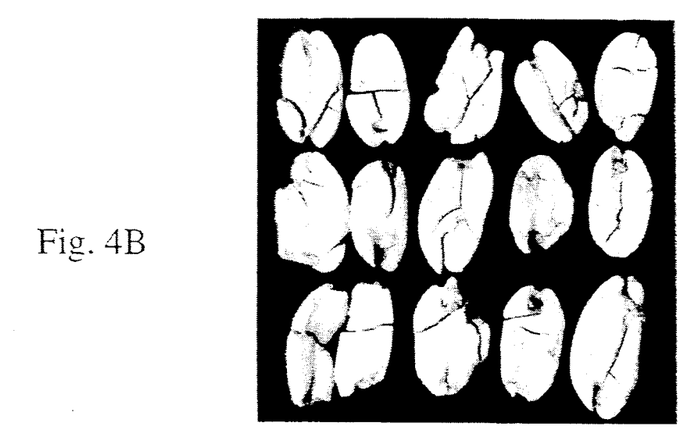
Figure 4C:
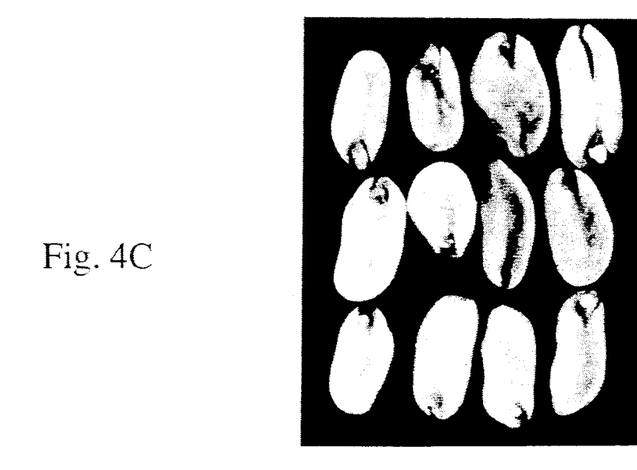

The flattened peanuts made with this process are reconstituted by hydrating them in a heated aqueous solution at 180° F. (82° C.) for 2 minutes. The hydrated peanuts are then roasted in high oleic sunflower oil for 6 minutes at 335° F. (168° C.) to develop flavor and color. The fat content of the roasted peanut is 29-30% fat which is about a ⅓ less fat by weight vs. full fat peanuts. The finished nuts have a packed bulk density of 0.29 gm/cc. This is due to an actual expansion of the nut cotyledon as well as to the removal of fat. The nuts' surface is smooth but not glassy and the amount of visible cracks (see FIGS. 3C and 4C) is significantly less than conventionally defatted peanuts (FIGS. 4B and 3B). The texture is crisp and not hard. The salt used is sodium chloride.

EXAMPLE 2

The same mixture of peanuts/salt and defatting operation as in Example 1 are used except that the peanuts are pressed for 30 minutes at 2500 psig. The fat content of the defatted peanuts is 25% by weight. 1125 gms of the flattened nuts are then reconstituted by immersing them in a 0.5% dextrose solution at 212° F. (100° C.) for 2 minutes. Salt (33.8 gms) is then mixed into the hydrated peanuts. The nuts are roasted for 4.5 minutes in a Frymaster oil roaster containing 54 pounds of high oleic sunflower at 340° F. The roasted nuts have a fat content of 32.6% fat and a packed bulk density of 0.29 gm/cc. The nuts look the same as the nuts prepared in Example 1 and have a crisper/crunchier texture. The nuts also have a desirable salty taste.

EXAMPLE 3

Defatting Pecans

A mixture of 270 gms of pecans and 960 gms of a 64/36 salt/oil slurry is placed in a cage press and pressed for 10 minutes at 5100 psig and at ambient temperature. The pressure is raised incrementally. The cake is broken and the pecans are separated from the salt. The pecans are flattened, and there is little breakage of the pecans. Many of the pecans remain as whole nuts. The flattened pecans are then reconstituted by immersing them in a hot water bath (212° F. (100° C.) for 2 minutes) and then roasted in high oleic sunflower oil at 335° F. (168° C.) for 2.5 minutes. The nuts are air cooled after oil roasting. The flavor intensity and character of these nuts are equal to full fat pecans. These nuts have 21% less fat by weight or 50% less fat on a volume basis than native pecans. The salt used is sodium chloride.

EXAMPLE 4

Defatting Roasted Peanuts

Raw blanched peanuts are oil roasted at 335° F. for 6 minutes to develop their flavor and color. The moisture content of these peanuts at the end of roast is less than 1.5%. While the peanuts are still hot (220° F.), they are mixed with a salt/oil slurry (64/36 salt/oil slurry). The salt is a finely ground salt (sodium chloride with a particle size less than 400 microns) and the oil is peanut oil. The ratio of roasted peanuts to salt/oil slurry is 350/960. The mixture is then placed in a cage press and defatted at 7500 psig for 10 minutes. The resultant cake is then delumped and the pressed peanuts separated from the salt. The defatted peanuts contain 20% fat. Physically very little damage is done to the roasted peanuts.

The peanuts are reconstituted by hydrating them in 180° F. (82° C.) water for 2 minutes. They are then oil roasted at 335° F. (168° C.) for 3 minutes to expand the peanuts back to their original shape and to further develop flavor. The resultant peanuts have a texture and flavor very similar to full fat peanuts and are 33% fat (⅓ less fat than full fat peanuts).

EXAMPLE 5

Whole raw peanuts are defatted using a cage press. The number of whole peanuts is counted initially and at the end of the defatting process. Samples 1, 2 and 3 are pressed in a laboratory cage press. Sample 3 is prepared using a salt/peanut oil slurry as in Example 1. Sample 4 is commercially pressed. In Sample 4 the fine nut particles are separated from the peanuts before roasting.

| Sample | Pressing Conditions | |
|---|---|---|
| 1 | 2000 psi/30 min. | |
| 2 | 5100 psi/10 min. | |
| 3 | 5100 psi/10 min. | |
| 4 | Commercial processed | |
| | After Roasting 335° F./6 min. | |
| Sample | Whole | Splits | Pieces |
| 1 | 9.1% | 77.6% | 13.4% |
| 2 | 12.8% | 62.2% | 25.0% |
| 3 | 28.4% | 69.5% | 2.1% |
| 4 | 4.3% | 91.1% | 4.6% |

The amount of whole peanuts remaining were determined after the peanuts were roasted and shaken for 25 seconds in a plastic bag to simulate seasoning and handling effects. In sample 3, 28.4% of the peanuts remained as whole nuts whereas in samples 1 and 2 only 9.1 and 12.8% respectively remained as whole nuts. The amount of peanuts that were less than a cotyledon half was also substantially higher in samples 1 and 2 than in sample 3. In sample 4 the commercial product had the smallest amount of whole peanuts (4.3%). It is readily apparent that the process herein keeps 2 or more times the amount of whole nuts and substantially reduces the amount of peanut pieces (nuts smaller than a cotyledon half).

What is claimed is:

1. A process for preparing defatted nuts having 25% to 80% less oil than the native nut comprising:
   1) mixing a nut with a particulate material having a particle size of less than 1000 microns, the weight ratio of particulate to nut being in the range of 1:1 to 3:1;
   2) pressing the nut/particulate mixture at between 1500 and 7500 psig; and
   3) separating the nuts from the particulate.

2. A process according to claim 1, wherein the separated nuts are hydrated with water at a temperature of 150° F. to 212° F. from 1 to 20 minutes and then roasted or dried to a moisture content of 10% or less within 20 minutes.

3. A process according to claim 2 wherein said nut is selected from the group consisting of peanuts, walnuts, filberts, pecans, cashews, almonds and Brazil nuts.

4. A process according to claim 2 wherein said particulate material is selected from the group consisting of salt, sand, ceramic, silica gel, sugar, starch, polydextrose, peanut solids and maltodextrins.

5. A process according to claim 4 which comprises the additional step of washing the nuts from step (3) with water at a temperature of up to 100° F. for about 0.25 to about 2 minutes to remove oil and particulates.

6. A process according to claim 5 wherein said particulate has a particle size in the range of 10 microns to 500 microns.

7. A process according to claim 6 wherein said nut is a peanut and wherein said particulate is sodium chloride.

8. A process according to claim 7 wherein said nut is a blanched peanut having a moisture content of 3% to 10%.

9. A process according to claim 4 wherein said nut is roasted in oil within 20 minutes after hydration.

10. A process according to claim 9 wherein said oil is selected from the group consisting of vegetable oils and low calorie oils.

11. A process according to claim 10 wherein said oil is selected from the group consisting of sunflowerseed, peanut, safflower and canola oils.

12. A process according to claim 4 wherein said defatted nuts are dry roasted after the hydration step.

13. A process according to claim 4 wherein the hydration water contains a flavorant.

14. A process according to claim 13 wherein said flavorant is dextrose, fructose or maltodextrin.

15. A process according to claim 14 wherein(said particulate-is a salt and said nut is a peanut.

16. A process for preparing defatted peanuts having from 8% to 40% fat comprising:
   a) mixing blanched peanuts with an oil slurry of a food compatible particulate material having a particle size of less than 1000 microns, wherein the weight ratio of particulate to nuts is from 1:1 to 3:1;
   b) pressing the nut/particulate/oil mixture at between 1500 and 7500 psig; and
   c) separating the peanuts from the oil and particulates.

17. A process according to claim w said blanched peanuts are dried to a moisture content 3% to 5% using hot air at 90° F. to about 110° F. before pressing.

18. A process according to claim 17 wherein the peanuts are hydrated with water at a temperature of 150° F. to 212° F. for about 1 to about 5 minutes after separation.

19. A process according to claim 18 wherein the hydrated peanuts are roasted in a vegetable oil or low calorie oil.

20. A process according to claim 19 wherein said particulate material is selected from the group consisting of salt, sand, ceramic, silica gel, sugar, starch, polydextrose, peanut solids, and maltodextrins.

21. A process according to claim 20 which comprises the additional step of washing the nuts with hot water at a temperature of less than 100° F. for about 0.25 to 2 minutes to remove the oil and particulates from the nuts before the hydration step.

22. A process according to claim 21 wherein said particulate has a particle size in the range of 10 to 500 microns.

23. A process according to claim 22 wherein the oil slurry of the particulate is a peanut oil slurry of sodium chloride.

24. A process according to claim 23 wherein 2% to 4% sodium chloride is added to the hydrated peanuts before roasting.

25. A process for preparing a defatted peanut comprising:
a) roating peanuts to a moisture content of less than 3%;
b) mixing the roasted peanuts with an oil slurry of a food compatible particulate material having a particle size of less than 1000 microns, wherein the weight ratio of particulate to nuts is from 1:1 to 3:1;
c) pressing the nut/particulate/oil mixture at between 1500 and 7500 psig; and
d) separating the peanuts from the oil and particulates.

* * * * *

UNITED STATES PATENT AND TRADEMARK OFFICE
CERTIFICATE OF CORRECTION

PATENT NO. : 5,164,217
DATED : November 17, 1992
INVENTOR(S) : Wong et al.

It is certified that error appears in the above-identified patent and that said Letters Patent is hereby corrected as shown below:

```
In the Abstract, line 4, "100" should read --1000--
In the Abstract, line 7, "40" should read --400--
In Column 10, line 57, "wherein(said" should read -- wherein said--
In Column 10, line 58, "particulate-is" should read --particulate is--
In Column 11, line 1, "w" should read --16 wherein--
In Column 12, line 12, "roating" should read --roasting--
```

Signed and Sealed this

Twelfth Day of October, 1993

Attest:

BRUCE LEHMAN

*Attesting Officer*     *Commissioner of Patents and Trademarks*